(12) United States Patent
Takahata et al.

(10) Patent No.: US 6,556,189 B1
(45) Date of Patent: Apr. 29, 2003

(54) TOUCH PANEL DEVICE

(75) Inventors: Kazuhiko Takahata, Kyoto (JP); Takao Hashimoto, Kyoto (JP); Kazuhiro Nishikawa, Kyoto (JP); Hiroshi Kirimura, Kyoto (JP)

(73) Assignee: Nissha Printing Co., Ltd., Kyoto (JP)

( * ) Notice: Subject to any disclaimer, the term of this patent is extended or adjusted under 35 U.S.C. 154(b) by 0 days.

(21) Appl. No.: 09/673,881

(22) PCT Filed: Apr. 21, 1999

(86) PCT No.: PCT/JP99/02116
§ 371 (c)(1),
(2), (4) Date: Oct. 23, 2000

(87) PCT Pub. No.: WO99/56199
PCT Pub. Date: Nov. 4, 1999

(30) Foreign Application Priority Data

Apr. 24, 1998 (JP) ............................. 10-131053
Oct. 1, 1998 (JP) ............................. 10-279622

(51) Int. Cl.[7] ................................................. G09G 5/00
(52) U.S. Cl. ..................................... 345/173; 178/18.03
(58) Field of Search ............................ 345/173–178, 345/182, 183, 102; 178/18.01, 18.03–18.11; 349/61

(56) References Cited

U.S. PATENT DOCUMENTS 5,153,386 A * 10/1992 Siefer et al. ................. 345/173
5,510,813 A * 4/1996 Makinwa et al. ............ 345/173
5,844,175 A * 12/1998 Nakanishi et al. ........... 345/173

FOREIGN PATENT DOCUMENTS

| JP | 56-11581 | 2/1981 |
| JP | 59-98528 | 7/1984 |
| JP | 62-53726 | 4/1987 |
| JP | 63-281190 | 11/1988 |
| JP | 8-286812 | 1/1996 |
| JP | 9-185457 | 7/1997 |

* cited by examiner

*Primary Examiner*—Regina Liang
(74) *Attorney, Agent, or Firm*—Wenderoch, Lind & Ponack, L.L.P.

(57) ABSTRACT

The sides of a touch panel are entirely covered with and sealed in an outer package. The touch panel includes a transparent insulating liquid that is sealed in a space formed by adhering an upper electrode film and a lower electrode body at edges thereof. The transparent insulating liquid transparently shows or exposes at least an operation area of the touch panel.

16 Claims, 8 Drawing Sheets

TOUCH PANEL DEVICE

TECHNICAL FIELD

The present invention relates to a resistor-film type touch panel capable of inputting information with a finger or pen positioned in front of a display device such as a liquid crystal display device (LCD) for use in an electronic notebook, a personal computer, or the like; or CRT or the like and, particularly, a highly practical touch panel device subjected to a treatment for preventing leakage of a transparent insulating liquid sealed in the touch panel.

BACKGROUND ART

As a conventional touch panel, as shown in FIG. 23, the one in which a transparent insulating liquid 95 is sealed in a space obtained by adhering an upper electrode film 91 and a lower electrode body 92 at their edges with an adhesive agent, a double-face adhesive tape 103, or the like so as to suppress reflection of a light made incident from the touch panel observer side and improve the visibility of the liquid crystal screen (see Japanese Utility Model Laid-open Publication No. 59-98528 and Japanese Patent Laid-open Publication No. 63-281190). It is noted that 93 denotes an upper transparent electrode, 94 denotes a lower transparent electrode, 95 denotes a transparent insulating liquid, 100 denotes a spacer and 103 denotes a double-face adhesive tape.

However, in cases where a touch panel device is used under a severe. environment or the like, the transparent insulating liquid 95 sealed in the touch panel is exuded outside at the portion where the upper electrode film 91 and the lower electrode body 92 of the touch panel are adhered, causing leakage. Also, the transparent insulating liquid 95 leaks from a damaged portion such as a crack or the like when the touch panel is damaged in the cases where too strong pressure is applied when an input is made, the touch panel is dropped or an external pressure is applied to the touch panel.

In the case where such liquid leakage occurs, it becomes difficult to suppress reflection of a light made incident from the touch panel observer side or improve the visibility of the liquid crystal screen. Further, the upper electrode film of the touch panel bends depending on the degree of liquid leakage, thereby making it likely that poor insulation occurs.

Also, since the leaking insulating transparent liquid 95 is put into contact with a constituent member other than the touch panel such as, for example, a circuit board or the like, a failure of the constituent member is caused or the aftertreatment when the damaged touch panel is exchanged, for example, wiping of the transparent insulating liquid 95 or the like becomes difficult.

Accordingly, an object of the present invention is to provide a touch panel device that does not impair the suppression of reflection by a transparent insulating liquid or the effect of improved visibility, does not cause poor insulation or failures in a circuit board or the like or does not make difficult the aftertreatment when a damaged touch panel is exchanged, by which the above-described issues can be solved.

DISCLOSURE OF INVENTION

In order to achieve the above object, the present invention has the following constitutions.

According to a first aspect of the present invention, there is provided a touch panel device, wherein sides of a touch panel in which a transparent insulating liquid is sealed in a space formed by adhering an upper electrode film and a lower electrode body at edges thereof are entirely covered with and sealed in an outer package which transparently shows or exposes at least an operation area of the touch panel and a periphery of a lower surface of the touch panel is also covered continuously from the sides of the touch panel by the outer package without impeding visibility of at least the operation area on the lower surface of the touch panel.

According to a second aspect of the present invention, there is provided a touch panel device according to the first aspect, wherein the outer package is a bag which transparently shows at least the operation area of the touch panel and an opening of the bag is closed to seal an inside of the bag.

According to a third aspect of the present invention, there is provided a touch panel device according to the first aspect, wherein the outer package comprises:

an upper film adhered on an upper surface of the touch panel which transparently shows at least the operation area of the upper surface of the touch panel and has an area larger than the upper surface thereof;

a lower support body adhered on a lower surface of the touch panel which transparently shows at least the operation area of the lower surface of the touch panel and has an area larger than the lower surface thereof; and a sealing material for sealing a groove-like portion formed by edges of the upper film and the lower support body and the end surfaces of the touch panel.

According to a fourth aspect of the present invention, there is provided a touch panel device according to the first aspect, wherein the outer package has an outer package body in a rectangular parallelepiped box shape which houses the touch panel and exposes at least the operation area on an upper surface of the touch panel and transparently shows the operation area on a lower surface of the touch panel; and a sealing material for sealing at least the outside of the operation area on the upper surface of the touch panel to seal an inside of the outer package body housing the touch panel.

According to a fifth aspect of the present invention, there is provided a touch panel device according to the first aspect, wherein the outer package has an outer package body in a rectangular parallelepiped box shape that houses the touch panel and exposes at least the operation areas on an upper surface and the lower surface of the touch panel; and sealing materials for respectively sealing at least outsides of the operation areas on the upper surface and the lower surface of the touch panel to seal an inside of the outer package body housing the touch panel.

According to a sixth aspect of the present invention, there is provided a touch panel device according to the first aspect, wherein the outer package comprises:

an upper film adhered on an upper surface of the touch panel which exposes at least the operation area on the upper surface of the touch panel and is protruded outside from the upper surface thereof;

a lower support body adhered on the lower surface of the touch panel which exposes at least the operation area on the lower surface of the touch panel and is protruded outside from the lower surface thereof; and a sealing material for sealing a groove-like portion formed by edges of the upper film and the lower support body and end surfaces of the touch panel.

According to a seventh aspect of the present invention, there is provided a touch panel device according to the first aspect, wherein the outer package comprises:

a lower support body adhered on a lower surface of the touch panel which transparently shows at least the operation area on the lower surface of the touch panel and has an area larger than the lower surface thereof and a sealing material for sealing a recessed portion formed by edges of the lower support body and end surfaces of the touch panel.

According to an eighth aspect of the present invention, there is provided a touch panel device according to the first aspect, wherein the outer package comprises:

a lower support. body adhered on the lower surface of the touch panel which exposes at least the operation area on the lower surface of the touch panel and is protruded outside from the lower surface thereof and a sealing material for sealing a recessed portion formed by edges of the lower support body and end surfaces of the touch panel.

According to a 10th aspect of the present invention, there is provided a touch panel device according to any one of the third to eighth aspects, wherein the sealing material has been subjected to degassing treatment so that voids are not generated by repeated inputs or the like.

According to an 11th aspect of the present invention, there is provided a touch panel device according to the third aspect, wherein a thickness of the lower support body is 0.025 mmor more.

According to a 12th aspect of the present invention, there is provided a touch panel device according to the third or sixth aspect, wherein the upper film has been subjected to low-reflection treatment.

According to a 13th aspect of the present invention, there is provided a touch panel device according to any one of the first to 12aspects, wherein spacers with an area concentration of 0.01%–5% and a height of 15 $\mu$m or less are provided on a transparent electrode surface of the upper electrode film or the lower electrode body of the touch panel and the insulating transparent liquid has a viscosity of 30 cps or less.

According to a 14th aspect of the present invention, there is provided a touch panel device according to any one of the first to eighth aspects, wherein the insulating transparent liquid has been subjected to degassing treatment so that voids are not generated by repeated inputs or the like.

According to a 15th aspect of the present invention, there is provided a touch panel device according to any one of the first to 14th aspects, wherein spacers with an area concentration of 0.01%–5% and height of 15 $\mu$m or less are provided on a transparent electrode surface of the upper has a viscosity of 30 cps or less,has been subjected to degassing treatment, and has an index of refraction satisfying the following relational expression $$\left(\frac{n_A - n_B}{n_A + n_B}\right)^2 < \left(\frac{n_A - 1}{n_A + 1}\right)^2$$

where refracting indices of the transparent electrode, the transparent insulating liquid, and air are $n_A$, $n_B$, and 1, respectively, while liquid injecting holes are provided outside the operation area in one surface of the touch panel and in a member covering this surface and the liquid injected holes are sealed.

According to a 16th aspect of the present invention, there is provided a touch panel device according to any one of the first to eighth aspects, wherein at least one transparent electrode surface of the upper electrode film or the lower electrode body of the touch panel has been subjected to satin finish treatment so as to scatter light to prevent light interference between the transparent electrodes.

According to a 17th aspect of the present invention, there is provided a touch panel device according to any one of the third, sixth, seventh, eighth, and 11th aspects, wherein the lower support body has been subjected to low-reflection treatment.

BRIEF DESCRIPTION OF DRAWINGS

These and other aspects and features of the present invention will become clear from the following description taken in conjunction with the preferred embodiments thereof with reference to the accompanying drawings, in which.

BEST MODE FOR CARRYING OUT THE INVENTION

Figure 1:
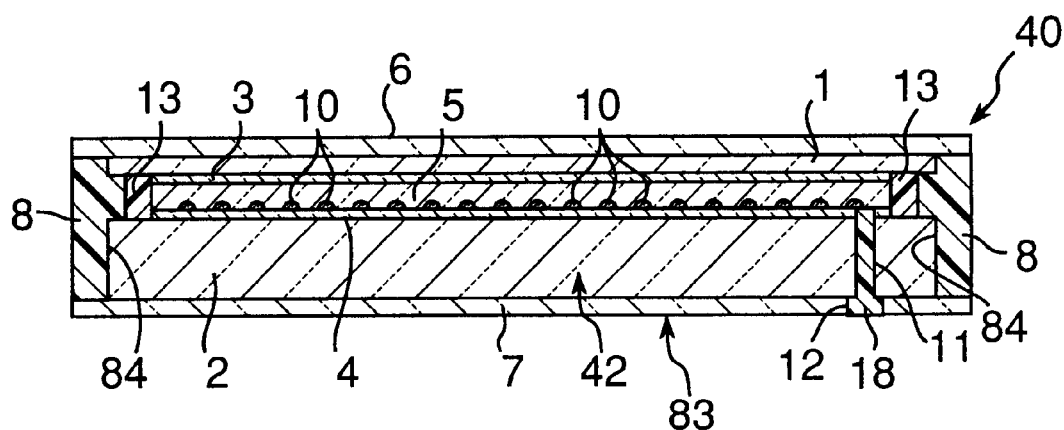
FIG. 1 is a cross-sectional side view showing a touch panel device according to a first embodiment of the present invention.

Before the description of the present invention proceeds, it is to be noted that like parts are designated by like reference numerals throughout the accompanying drawings.

A first embodiment of the present invention will be described in detail with reference to the accompanying drawings below.

FIG. 1 is a cross-sectional side view showing a touch panel device according to the first embodiment of the present invention.

The touch panel device 40 according to the above first embodiment is characterized in that a touch panel 42 in a generally rectangular-parallelepiped shape is sealed in an outer package 83 in a generally rectangular-parallelepiped box shape which transparently shows at least the operation area 9 of the touch panel 42. The means for sealing the touch panel 42 in the outer package 83 is constituted such that a rectangular upper film 6 and a rectangular lower support body 7, each having an area larger than the touch panel 42 are adhered onto the upper and lower surfaces, respectively, of the touch panel 42 and a groove-like portion 84 in a rectangular frame shape formed by the four peripheral side edges of the upper film 6 and the lower support body 7 and the peripheral end surfaces of the touch panel 42 is sealed by using a sealing material 8.

The touch panel 42 housed in the outer package 83 of the touch panel device 40 according to the aforementioned first embodiment is constituted such that a transparent insulating liquid 5 is sealed in a space formed by adhering a rectangular upper electrode film 1 and a rectangular lower electrode body 2 made of glass at their peripheral edges with a double-face adhesive tape 13 and thus generally known ones can be used. It is noted that, as is expected, an upper transparent electrode 3 is formed on the lower surface of the upper electrode film 1 and that a lower transparent electrode 4 is formed on the upper surface of the lower electrode body 2. Also, instead of the double-face adhesive tape 13, an adhesive agent or the like is selectively used for adhering the upper electrode film 1 and the lower electrode body 2 at their peripheral edges. It is noted that the touch panel 42 of FIG. 1 is a so-called film/glass type touch panel, in which the upper electrode film 1 is made of a film and the lower electrode body 2 is made of glass.

Also, in this touch panel 42, there are usually provided a multiplicity of spacers 10 in the space formed by adhering the upper electrode film 1 and the lower electrode body 2 at their peripheral edges. Specifically, there are provided a multiplicity of transparent spacers 10 on the transparent electrode surface of either the upper electrode film 1 or the lower electrode body 2 of the touch panel 42. The area concentration of the spacers 10 to the transparent electrode surface is preferably 0.01%–5%. In the case where no spacer 10 is provided or the area concentration is less than 0.01%, the switching response is poor. That is, since the contact area between the transparent electrodes tends to be large when the upper surface of a touch panel 42 is pressed with a finger or pen, the electrode separation of the upper electrode film 1 is unfavorable, resulting in a slower response. Also, even if spacers 10 are provided, inputs become difficult in the cases where there are provided too many spacers to the extent that the area concentration exceeds 5%. This is because the input load becomes heavy, that is , a heavy load is required to put the transparent electrodes into contact when the upper surface of the touch panel 42 is pressed with a finger or pen. Further, the height of the spacer 10 is preferable 15 μm or less because the input load also becomes heavy in the case of higher than 15 μm. When the area concentration of spacers 10 and the height of the spacer 10 are both within the aforementioned preferable ranges, the performance of a normal touch panel 42 can be sufficiently ensured in the light of the switching response and the input load.

After the touch panel 42 is enclosed in the outer package 83, a transparent insulating liquid 5 is sealed in the aforementioned space formed by adhering the upper electrode film 1 and the lower electrode body 2 at their peripheral edges so as to suppress the reflection of a light made incident from the touch panel observer side and improve the visibility of the liquid crystal screen. The transparent insulating liquid 5, as its kind, needs to be a material which has electrical insulation and a liquid which does not affect other constituent materials of the touch panel 42. For example, silicon oil, fluoric inert liquid, methylent iodide, or the like can be used. It is noted that the same switching response as that of a touch panel in which a transparent insulation liquid is not injected can be obtained by limiting the viscosity of the transparent insulating liquid 5 to 30 cps or less in the case where, for example, spacers 10 with an area concentration of 0.01%–5% and a height of 15 μm or less are provided on a transparent electrode surface of either the upper electrode film 1 or the lower electrode body 2.

Also, a transparent insulating liquid 5 that has been subjected to a degassing treatment is preferably used. In a transparent insulating liquid 5 that has not been subjected to a degassing treatment, the gasses dissolved in the transparent insulating liquid 5 can generate voids with repeated input operations and environment changes. In this case, the visibility and the switching response are deteriorated. When a transparent insulating liquid 5 has been subjected to a degassing treatment, voids are not generated even with repeated input operations. For a degassing treatment, for example, a method wherein dissolved gasses are separated and removed under a reduced pressure atmosphere, a method called a reflux method or the like is employed.

Although suppression of the light reflection is conventionally mentioned as one of objects of sealing a transparent insulating liquid 5 in a space of a touch panel 42, in fact, not all insulating and transparent liquids can achieve the object in any case. If the refractive index difference between the transparent insulating liquid 5 and the transparent electrode is smaller than the refractive index difference between air and the transparent electrode, the reflectance at the interface between the transparent insulating liquid 5 and the transparent electrode is smaller than the reflectance at the interface between air and the transparent electrode, which improves the transmittance. Therefore, it is preferable in the light of a light reflection suppression effect that the transparent insulating liquid 5 satisfies the following relational expression, $$\left(\frac{n_A - n_B}{n_A + n_B}\right)^2 < \left(\frac{n_A - 1}{n_A + 1}\right)^2$$

where the refractive indices of the transparent electrode, the transparent insulating liquid, and air are $n_A$, $n_B$, and 1, respectively. The left and right terms of the above relational expression represent the reflectance at the interface between the transparent insulating liquid 5 and the transparent electrode and the reflectance at the interface between air. and the transparent electrode, respectively.

The transparent insulating liquid 5 also acts as a lubricant, generating an effect of improving the durability of transparent conductive films, that is, the upper transparent electrode 3 and the lower transparent electrode 4. Furthermore, since the transparent insulating liquid 5 can ensure a gap between the upper and lower electrodes, that is, between the upper transparent electrode 3 and the lower transparent electrode 4, occurrence of Newton's rings can be prevented when the touch panel 42 is placed levelly. In the case where the touch panel 42 is placed vertically, however, the gap sizes between the transparent electrodes vary due to the flow of the transparent insulating liquid 5, resulting in easy occurrence of Newton's rings in portions where the gap is small. Therefore, it is preferable that at least a surface of either the upper transparent electrode 3 or the lower transparent electrode 4 is subjected to a satin finish treatment. The satin finish treatment can scatter a light and prevent the light interference between the transparent electrodes. Examples of the satin finish method include sandblasting, embossing, mat coating, etching, and the like.

On the other hand, the aforementioned outer package enclosing the touch panel 42 is constituted, as described above, by an upper film 6 that is adhered on the upper surface of the touch panel 42 and has an area larger than the upper surface, a lower support body 7 that is adhered on the lower surface of the touch panel 42 and has an area larger than the lower surface, and a sealing material 8 for sealing a groove-like portion 84 formed by the peripheral edges of the upper film 6 and the lower support body 7 and the end surfaces of the touch panel 42. This constitution will be described in further detail.

Materials of the upper film 6 are not particularly limited so long as they have flexibility and light transmission at least in the operation area. The upper film 6 is adhered on the upper surface of the upper electrode film 1. Examples of the material of the upper film 6 include, specifically, engineering plastic such as polycarbonate, polyamide, polyether, or the like; and acrylic, polyethylene terephthalate, polybutylene terephthalate, polystyrene, cellulose, or the like. It is preferable to use a resin having excellent transparency at least in the operation area.

Examples of the material of the lower support body 7 include engineering plastic such as polycarbonate, polyamide, polyether, or the like; and acrylic, polyethylene terephthalate, polybutylene terephthalate, polystyrene, cellulose resins, or the like. It is preferable to use a resin having excellent transparency at least in the operation area. The thickness of the lower support body 7 is preferably 0.025 mm or more because those having a thickness less than 0.025 mm may have an issue in durability. It is noted that it is preferable to make the lower support body 7 thicker in the case where a so-called film/film type touch panel is used. This is to prevent the touch panel from bending by the load upon input.

Also, it is required to allow the upper film 6 to have an area larger than the upper surface of the touch panel 42 and the lower support body 7 to have an area larger than the lower surface of the touch panel 42 so that a groove-like portion 84 can be reliably formed by the peripheral edges of the upper film 6 and the lower support body 7 and the end surfaces of the touch panel 42 and the sealing material 8 for sealing the groove-like portion 84 can be reliably disposed at the groove-like portion 84 and can fulfill its sealing function without being peeled from the disposed position. As a specific example, the upper film 6 and the lower support body 7 have an area about 0.5 $\mu$m larger than the upper and lower surfaces of the touch panel 42, respectively. As a sealing material 8, besides common adhesive agents and double-face adhesive tapes, materials that have a sealing characteristic superior to an adhesive agent or double-face adhesive tape 13 used for adhering the edges of the touch panel 42, for example, thermosetting resins, UV-curable resins, thermo-UV curable resins, and such as acrylic, epoxy, urethane, silicon, or the like, can be used. Above all, various curable resins are superior in the sealing characteristic and particularly preferable.

Also, as a material of the sealing material 8, the same material as the material used for adhering the upper electrode film 1 and the lower electrode body 2 of the touch panel 42 at their peripheral edges may be used, but it is preferable to use the materials limited as above in order to improve the sealing characteristic. It is further preferable to subject the sealing material 8 to a degassing treatment so that the sealing characteristic is not deteriorated.

It is also preferable that at least either one of the upper film 6 and the lower support body 7 described above has been subjected to a low-reflection treatment. In general, about 4% of all the reflections of a touch-input type liquid crystal display device account for the all reflections at the touch panel surface. The treatment for suppressing the reflection to less than 1% is called a low-reflection treatment as mentioned above. As a method for this low-reflection treatment, there can be mentioned applying a low-refection material using a resin having a low refraction index such as a fluorine resin, a silicon resin, or the like, forming a multiple layers of metallic films by vapor deposition or the like, adhering a low-reflection film, subjecting the surface to a satin finish treatment by sandblasting, embossing, mat coating, etching, or the like, and so on.

It is noted that, in the case where the entire touch panel is sealed by the outer package, the surface of the touch panel device (outer package surface) is subjected to a low-reflection treatment while, in the case where the entire touch panel is not sealed by the outer package, the exposed surface of the touch panel (main body) is subjected to a low-reflection treatment, which is described later.

Figure 5:
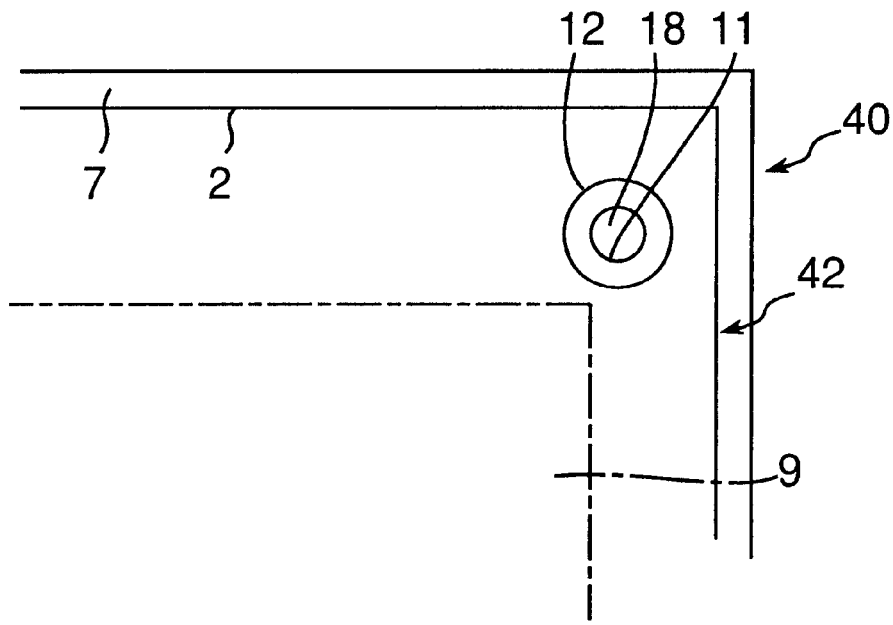
FIG. 5 is a partially enlarged plan view showing the touch panel device according to the above modification of the above first embodiment of FIG. 2.

Also, the aforementioned touch panel device according to the first embodiment of the present invention is provided with liquid injecting holes outside the operation area 9 in one surface of the touch panel 42 and a member for covering this surface so that the transparent insulating liquid 5 is filled from the outside of an outer package 83 into a space formed by adhering the upper electrode film 1 and the lower electrode body 2 at their edges after the touch panel 42 has been enclosed by the outer package 83. That is, as shown in FIG. 1, there are provided liquid injecting holes 11, 12 outside the touch panel operation area 9, in the lower electrode body 2 and the lower support body 7 for covering the lower electrode body 2, respectively, of the touch panel 42 described above (see FIGS. 5 and 6). The liquid injecting hole 12 is connected with the aforementioned space of the touch panel 42 via the liquid injecting hole 11 so that the transparent insulating liquid 5 can be injected from the outside of the outer package 83 into the space of the touch panel 42 via the liquid injecting hole 12 and then the liquid injecting hole 11. After injection of the transparent insulating liquid 5, the liquid injecting holes 12, 11 are sealed with a sealing material 18 so that the liquid does not leak at the liquid injection holes 11, 12. This sealing material 18 is a material similar to the aforementioned sealing material 8.

It is noted that the liquid injecting hole 12 provided in the lower support body 7 is preferably formed larger than the liquid injecting hole 11 provided in the lower electrode body 2. This is because the periphery of the liquid injecting hole 11 on the lower surface of the touch panel 42 is not subjected to a low-reflection treatment or the like because the touch panel 42 is sealed in the outer package 83, and thus the tight adhesion with the sealing material 18 can be obtained at this portion, thereby improving the sealing effect.

Figure 6:
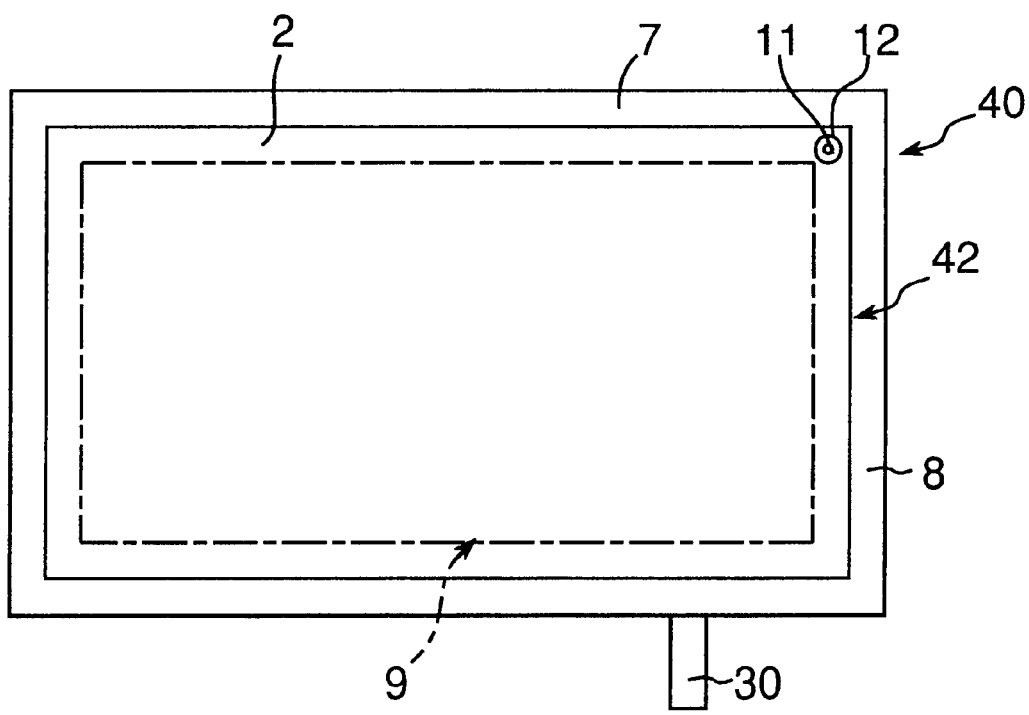
FIG. 6 is a plan view showing the touch panel device of FIG. 5 seen from the liquid injection side.

It is noted that 30 denotes a connector of the touch panel 42 in FIG. 6.

Figure 2:
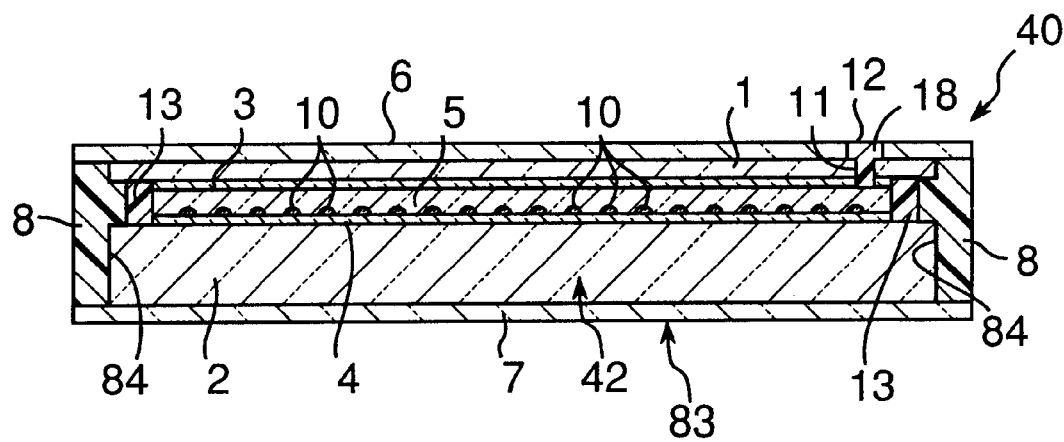
FIG. 2 is a cross-sectional side view showing a touch panel device according to a modification of the above first embodiment.

Also, in the case of a so-called film/glass type touch panel 42, of which the lower electrode body 2 is made of glass as in the first embodiment, the liquid injecting holes 11, 12 are preferably formed on the upper surface side of the touch panel 42 as shown in FIG. 2 as a modification of the first embodiment, rather than the lower surface side of the touch panel 42. This is because the glass intensity is not deteriorated because no hole needs to be formed in the glass, which is the lower electrode body 2. It is noted that it is not preferable to provide the liquid injecting hole. on the side surface of the touch panel 42 as a gap because a circuit can be disconnected.

Figure 3:
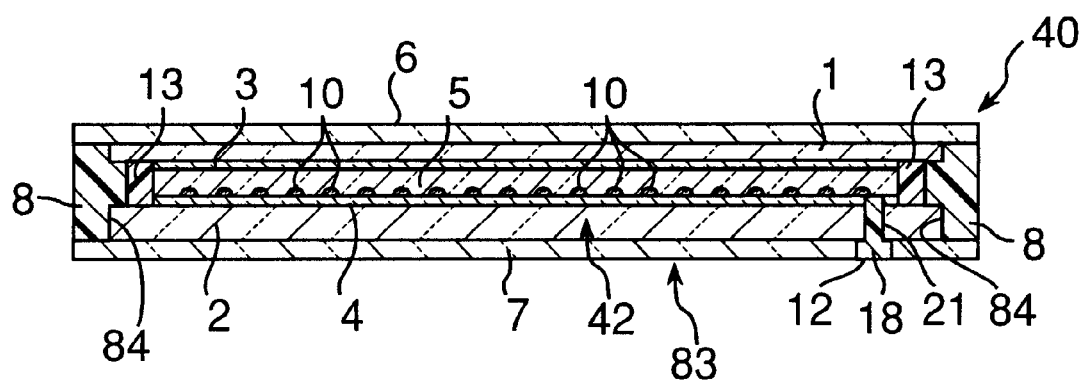
FIG. 3 is a cross-sectional side view showing a touch panel device according to a second embodiment of the present invention.

Also, as the aforementioned touch panel, a so-called film/film type touch panel, in which both the upper film 6 and the lower electrode body 2 are made of a film, can be used. As such an example, FIG. 3 shows a cross-sectional side view showing a touch panel device according to a second embodiment of the present invention. In FIG. 3, the liquid injecting holes 11, 12 are provided on the lower surface side of the touch panel 42. Explanation is omitted because the second embodiment is the same as the first embodiment except that the lower electrode body 2 is made of a film.

Figure 4:
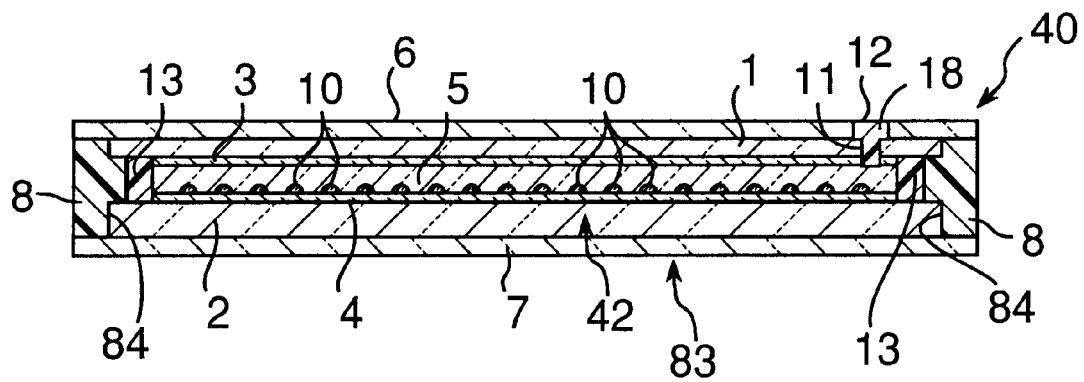
FIG. 4 is a cross-sectional side view showing a touch panel device according to a modification of the above second embodiment.

As a modification of the second embodiment, FIG. 4 shows an example in which the aforementioned liquid injecting holes 11, 12 are provided on the upper surface side of the touch panel 42.

It is noted that, in the case of a so-called film/film type touch panel 42, of which the lower electrode body 2 is made of a film, the liquid injecting holes 11, 12 are preferably formed on the lower surface side of the touch panel 42 as shown in FIG. 3. This is because, since the lower surface side of the touch panel 42 receives no stress upon input unlike the upper surface side of the touch panel 42, peeling of the sealing material 18 in the liquid injecting holes 11, 12 due to the deformation of the film, which is the lower electrode body 2, does not occur, that is, reliability in prevention of liquid leakage is not deteriorated.

Figure 7:
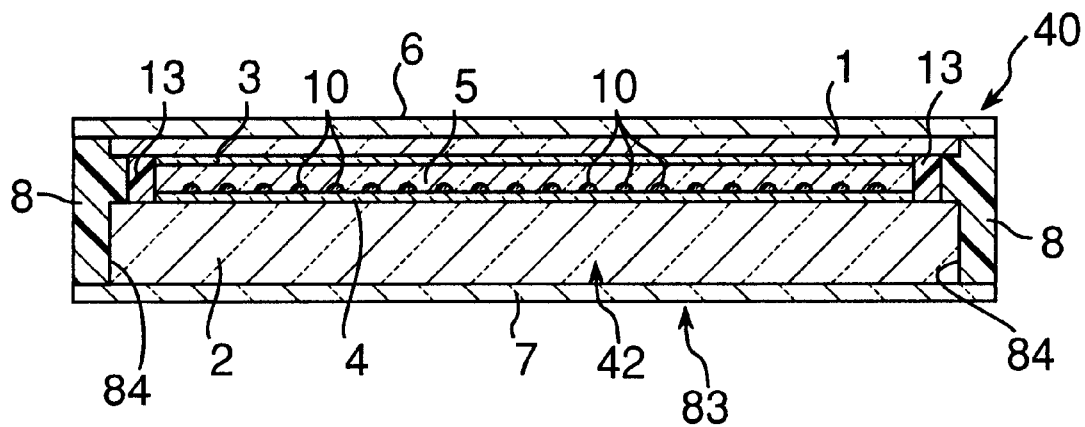
FIG. 7 is a cross-sectional side view showing a touch panel device according to another modification of the above first embodiment.

As another modification of the first embodiment, the transparent insulating liquid 5 may be filled in the space in advance before the touch panel 42 is enclosed in the outer package 83, as shown in FIG. 7. In this case, no liquid injecting holes 11, 12 need to be provided in the touch panel 42 and the outer package 83.

Figure 8:
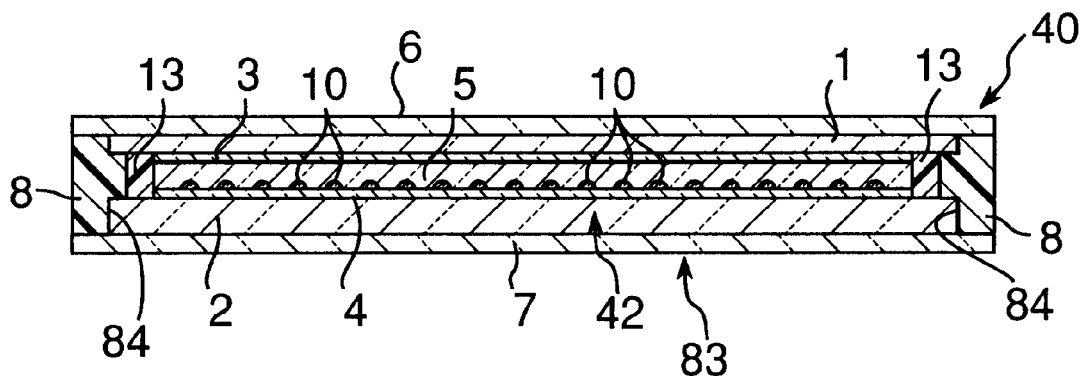
FIG. 8 is a cross-sectional side view showing a touch panel device according to another modification of the above second embodiment.

Also, similarly, as another modification of the second embodiment, the transparent insulating liquid 5 may be filled in the space in advance before the touch panel 42 is enclosed the outer package 83, as shown in FIG. 8. In this case, no liquid injecting holes 11, 12 are required to be provided in the touch panel 42 or the aforementioned outer package 83.

It is noted that, if the transparent insulating liquid 5 has been injected in the space of the touch panel 42 before the outer package 83 is formed, the transparent insulating liquid may leak from the space of the touch panel by external pressure applied when the upper film or the like is adhered and the like. Also, since the transparent insulating liquid flows when the upper film or the like is adhered, the adhered surface of the touch panel 42 and the outer package 83 cannot be kept smooth and becomes unstable, making work difficult. It is noted that, in the case where the transparent insulating liquid 5 is injected after the touch panel 42 is housed in the outer package 83, this issue is prevented if work is done after the air in the space of, the touch panel 42 is removed. That is, in the case where an air layer is present in the space of the touch panel 42, a method wherein the pressure is reduced in the space of the touch panel 42 and then the transparent insulating liquid 5 is injected is employed. Also, as another method, an air exhaust hole is provided apart from the liquid injecting holes for injecting the transparent insulating liquid 5 and the air is pushed out from the air exhaust hole by injecting the transparent insulating liquid 5 from the liquid injecting holes, which is generally performed.

Furthermore, as another example of the aforementioned outer package, the touch panel is wrapped in a bag and the opening of the bag is fused or sealed with a sealing material. This will be described as a third embodiment and a fourth embodiment below.

Figure 9:
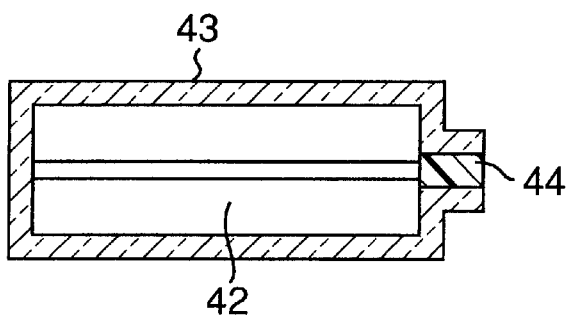
FIG. 9 is a cross-sectional side view showing a touch panel device according to a third embodiment of the present invention.

FIG. 9 is a cross-sectional side view showing a touch panel device according to the third embodiment of the present invention. In the touch panel device according to the third embodiment, a touch panel 42 in which a transparent insulating liquid 5 is sealed in the space formed by adhering the upper electrode film 1 and the lower electrode body 2 at their peripheral edges with a double-face adhesive tape 13 or the like is wrapped in a bag 43. The opening of the bag 43 is sealed by a sealing material 44 made of a material similar to the sealing material 8 used in the first embodiment or the like.

Figure 10:
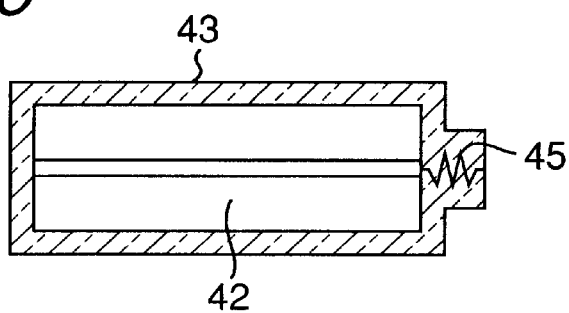
FIG. 10 is a cross-sectional side view showing a touch panel device according to a fourth embodiment of the present invention.

FIG. 10 is a cross-sectional side view showing a touch panel device according to the fourth embodiment of the present invention. In the touch panel device according to the fourth embodiment as in the third embodiment, a touch panel 42 in which a transparent insulating liquid 5 a is sealed in the space formed by adhering the upper electrode film 1 and the lower electrode body 2 at their peripheral edges with a double-face adhesive tape 13 or the like is also wrapped in a bag 43. In the fourth embodiment, the opening 45 of the bag 43 is sealed by fusing unlike the third embodiment.

Materials of the aforementioned bag 43 in the third and fourth embodiments are not particularly limited so long as the materials have flexibility and light transmission at least in the operation area. Examples include acrylic, polycarbonate, polyethylene terephthalate, polybutylene terephthalate, polystyrene, cellulose resins, or the like. Thus, the materials of the bag 43 are not particularly limited so long as the materials have flexibility and light transmission at least in the operation area.

Also, if the thickness of the bag 43 is less than 0.025 mm, the durability of the bag 43 is deteriorated. The bag 43 can be broken due to repeated writing with a pen or the like or the bag 43 can be broken by an excessive pressure or friction besides inputs, by which the liquid leakage cannot be reliably prevented. On the contrary, if the thickness of the bag 43 is over 0.15 mm, inputs into the touch panel 42 become difficult. Therefore, the thickness of the bag 43 is preferably 0.025 mm–0.15 mm. In the case where the touch panel 42 is wrapped in the bag 43, it is noted that, since the difference between the refraction index of an air layer and the refraction index of the touch panel 42 becomes large if the air layer is present between the upper electrode film 1 and the lower electrode body 2 and the bag 43, preferably, the upper electrode film 1 and the lower electrode body 2 and the bag 43 are integrally adhered via a transparent adhesive, bond, or the like so that the air layer is not generated. As a specific example of means for thus integrating the upper electrode film 1 and the lower electrode body 2 and the bag 43, the touch panel 42 is put into the bag 43 and the opening of the bag 43 is closed in a state that a vacuum is drawn in the bag 43.

As described above, in the case where liquid leakage is prevented by using the bag 43, a sealing material 44 is used or fused at the opening portion of the bag 43. Therefore, the site for sealing or fusing can be made as one side or one point, by which the sealing or fusing operation becomes easy. Also, in the case where the entire periphery of the touch panel 42 is sealed, some part thereof can be degraded and peeled in time with some cause because the area of the sealed portion is large. If even partial sealing is disabled, liquid leakage cannot be prevented. In contrast with this, in the case of the aforementioned bag 43, the possibility of degradation can be reduced compared with the case where the entire periphery of the touch panel 42 is sealed because the area of the sealed portion can be made small.

It is noted that the entire bag 43 does not need to be transparent. As long as at least the portion corresponding to the operation area on the upper and lower surfaces of the touch panel 42 is transparent, other portions may be opaque.

According to the above first to fourth embodiments, since the transparent insulating liquid 5 can be sealed doubly because at least the touch panel 42 is sealed in an outer package 83 which transparently shows at least the operation area, liquid leakage can be stopped by the outer package 83 and prevented even if the transparent insulating liquid 5 nearly leaks outside from the portion where the upper electrode film 1 and the lower electrode body 2 of the touch panel 42 are adhered at their edges or a damaged portion of the touch panel 42.

Therefore, the deterioration of prevention of reflection or effects of the improved visibility by a transparent insulating liquid 5 or poor insulation or failures in a circuit board or the like and difficulty in the aftertreatment at the exchange of a damaged touch panel 42, which are caused by liquid leakage, do not occur.

It is noted that the present invention is not limited to the above embodiments, but can be employed in many other aspects.

For example, the entire periphery of a touch panel 42 is sealed by an outer package 83 in the first and second embodiments, but the present invention is not limited to this. The sealing characteristic of the aforementioned adhered portion of the touch panel 42 can be improved by covering with the outer package part of the periphery of the touch panel 42, not the entire periphery, particularly a portion at least including the side portion in which liquid leakage is likely to occur in the touch panel 42.

Figure 11:
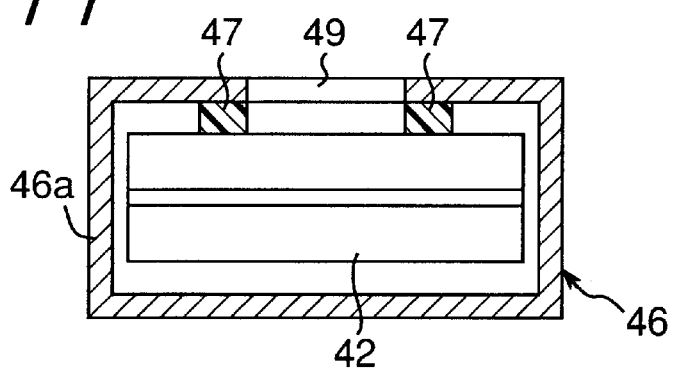
FIG. 11 is a cross-sectional side view showing a touch panel device according to a fifth embodiment of the present invention.
Figure 12:
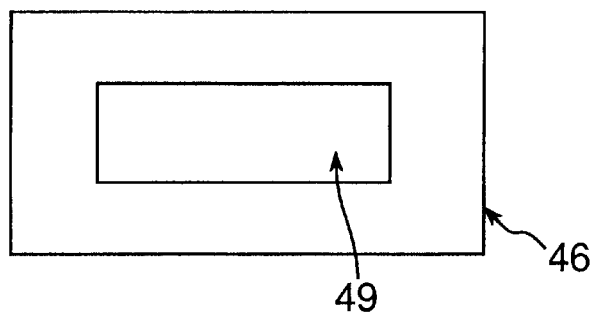
FIG. 12 is a plan view showing the touch panel device according to the above fifth embodiment of FIG. 11.

For example, FIGS. 11 and 12 are a cross-sectional side view and a plan view, respectively, showing a touch panel device according to a fifth embodiment of the present invention. In the fifth embodiment, a part of the upper 46 of which portion corresponding to the upper surface of the touch panel 42 with an outer package 46 of which portion corresponding to the upper a surface of the touch panel 42 is partially removed sa shown with reference numeral 49 in FIG. 11. In this fifth embodiment, the exposed portion of the upper surface of the touch panel 42 includes at least the touch panel operation area 9 (see FIGS. 5 and 6). The aforementioned outer package 46 is constituted such that the outer package body 46*a* is constituted by deforming a film made of a synthetic resin, rubber, or metal into a rectangular parallelepiped box shape and the inside portion of the outer package body 46*a* housing the touch panel 42 is sealed by tightly adhering the outer package body 46*a* and the upper surface of the touch panel 42 with a sealing material 47 for sealing so as to enclose the peripheries of the outer package body 46*a* and the exposed portion of the upper surface of the touch panel 42 in a frame shape. The sealing material 47 may also be provided on the side surface of the touch panel 42, but can fulfill its sealing function when provided at least outside the operation area 9 on the upper surface of the touch panel 42 in a frame shape. Since liquid leakage is prevented at the portion where the sealing material 47 is disposed, there is no problem even if the outer package body 46 such as a film or the like and the touch panel 42 are not adhered tightly. Also, at least the portion of the outer package 46 corresponding to the operation area on the lower surface of the touch panel 42 needs to be transparent, but there is no problem even if other portion may be opaque.

Figure 13:
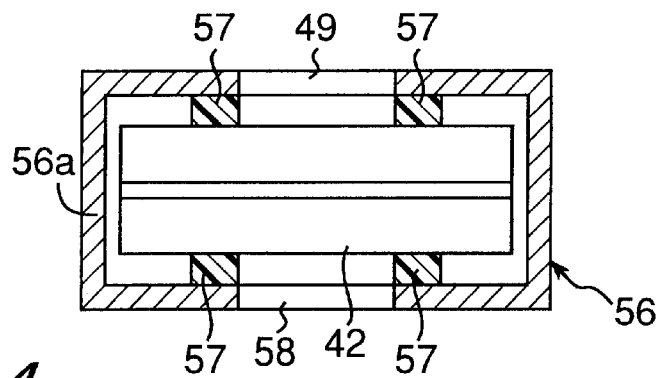
FIG. 13 is a cross-sectional side view showing a touch panel device according to a sixth embodiment of the present invention.
Figure 14:
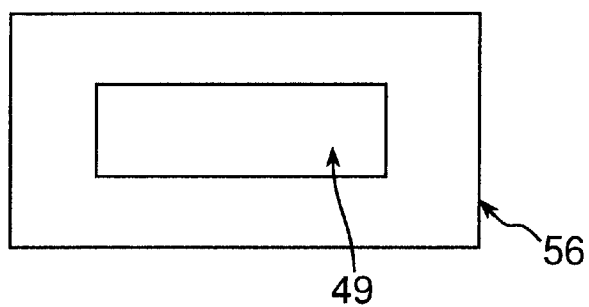
FIG. 14 is a plan view showing the touch panel device according to the above sixth embodiment of FIG. 13.

FIGS. 13 and 14 are a cross-sectional side view and a plan view, respectively, showing a touch panel device according to a sixth embodiment of the present invention. In the sixth embodiment, a part of the upper surface and a part of the lower surface of the touch panel 42 are exposed by enclosing the touch panel 42 with an outer package 56 in which a part of a portion of the outer package body 46*a* in the fifth embodiment corresponding to the lower surface of the touch panel 42 is removed as shown with reference numeral 58 in FIG. 13. In this sixth embodiment, the exposed portions of the upper surface and the lower surface of the touch panel 42 include at least the touch panel operation area 9 (see FIGS. 5 and 6). The outer package 56 is constituted such that the outer package body 56*a* is constituted by deforming a film made of a synthetic resin, rubber, or metal into a rectangular parallelepiped box shape and the inside of the outer package body 56*a* housing the touch panel 42 is sealed by tightly adhering the outer package body 56*a* and the upper surface of the touch panel 42 to each other so as to enclose at least the peripheries of the outer package body 56*a* and the exposed portions of the upper surface and the lower surface of the touch panel 42 in a frame shape with a sealing material 57. The sealing material 57 may also be provided on the side surface of the touch panel 42, but can fulfill its sealing function when provided at least outside the operation areas 9 on the upper surface and the lower surface of the touch panel 42 in a frame shape. Since liquid leakage is prevented at the portion where the sealing material 57 is disposed, there is no problem even if the outer package body 56*a* such as a film or the like and the touch panel 42 are not adhered tightly. Also, there is no problem even if the outer package 56 is opaque.

Figure 15:
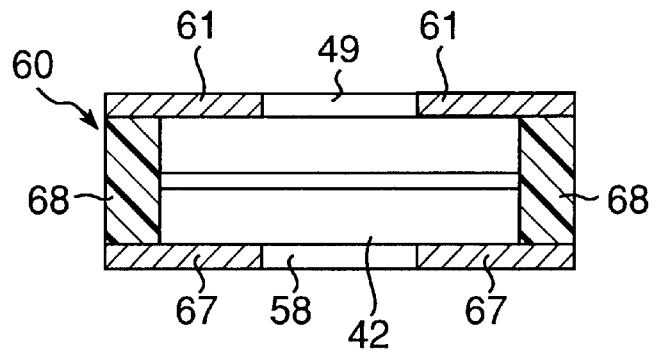
FIG. 15 is a cross-sectional side view showing a touch panel device according to a seventh embodiment of the present invention.
Figure 16:
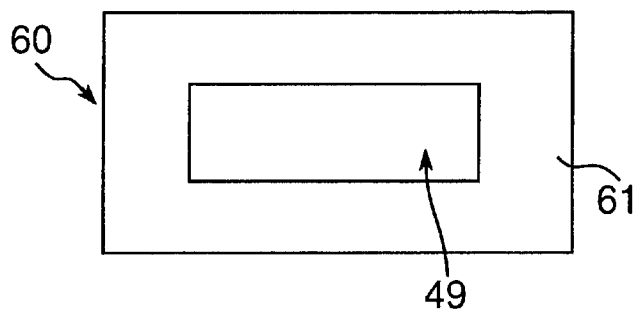
FIG. 16 is a plan view showing the touch panel device according to the above seventh embodiment of FIG. 15.

FIGS. 15 and 16 are a cross-sectional side view and a plan view showing a touch panel device according to a seventh embodiment of the present invention. In the seventh embodiment, the outer package body is not constituted by one material unlike the sixth embodiment. In the seventh embodiment, the material constitution of the outer package 60 is an upper film 61 in a rectangular frame shape, a sealing material 68 in a rectangular frame shape, and a lower support body 67 in a rectangular frame shape corresponding to the upper film 1, the sealing material 8, and the lower support body 7, respectively. In other words, the constitution is such that an opening is formed in each of the touch panel operation areas 9 of the upper film 1 and the lower support body 7 in the first and second embodiments. In more details, the upper film 61 in a rectangular frame shape and the lower support body 67 in a rectangular frame shape are adhered on the upper and lower surfaces, respectively, of the touch panel 42 so that the upper film 61 and the lower support body 67 are protruded outside from the touch panel 42 and a groove-like portion in a rectangular frame shape formed by the four peripheral side edges of each of the upper film 61 and the lower support body 67 and the peripheral end surfaces on the sides of the touch panel 42 is sealed with a sealing material 68 so as to seal a portion of the touch panel 42 in which liquid leakage is particularly likely to occur. As a result, the portion outside the operation area 9 on the upper surface of the touch panel 42 is covered by the upper film 61 in a rectangular frame shape and at least the operation area 9 of the upper surface of the touch panel 42 is exposed while the portion outside the operation area 9 on the lower surface of the touch panel 42 is covered by the lower support body 67 in a rectangular frame shape and at least the operation area 9 of the lower surface of the touch panel 42 is exposed. In this embodiment, it is noted that, since the upper film 61 and the lower support body 67 cover only the outside of the operation area of the touch panel, there is no problem even if the upper film 61 and the lower support body 67 are not transparent, but opaque.

Figure 17:
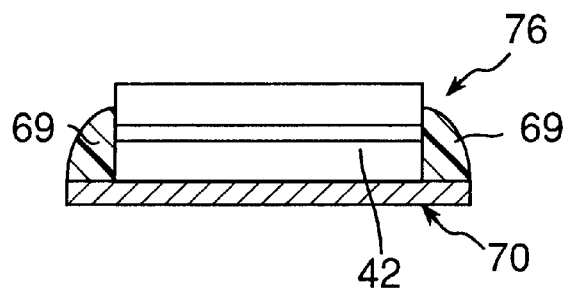
FIG. 17 is a cross-sectional side view showing a touch panel device according to an eighth embodiment of the present invention.
Figure 18:
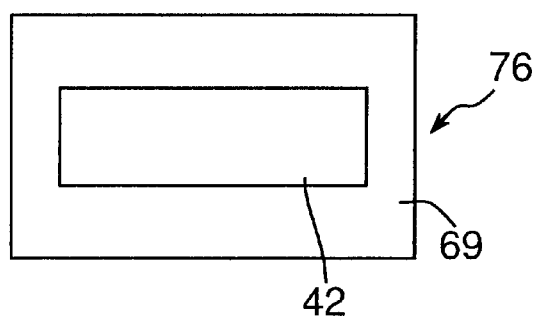
FIG. 18 is a plan view showing the touch panel device according to the above eighth embodiment of FIG. 17.

FIGS. 17 and 18 are a cross-sectional side view and a plan view, respectively, showing a touch panel device according to an eighth embodiment of the present invention. In the eighth embodiment, the outer package 76 is constituted by a lower support body 70 made of one film adhered on the lower surface of the touch panel 42 that is transparent at least in the operation area 9 on the lower surface of the touch panel 42 and has an area larger than the lower surface thereof; and a sealing material 69 for sealing a recessed portion formed by the side edges of the lower support body 70 and the side end surfaces of the touch panel. The sealing material 69 may be provided up to the outside of the operation area on the upper surface side of the touch panel 42 for sealing, but is applied to cover at least the portion in which liquid leakage is most likely to occur in the touch panel, that is, not only the side surfaces of the touch panel 42, but the portion where the liquid may be exuded due to a damage to the touch panel 42, that is, the interface between the touch panel 42 and the lower support body 70. As a material of the lower support body 70, the material similar to the material of the aforementioned lower support body 7 can be used. As a material of the sealing material 69, the material similar to the material of the aforementioned sealing material 8 can be used.

Figure 19:
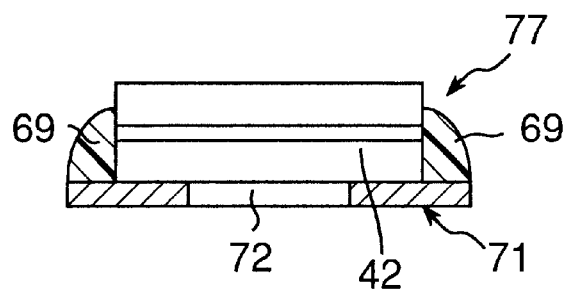
FIG. 19 is a cross-sectional side view showing a touch panel device according to a ninth embodiment of the present invention.
Figure 20:
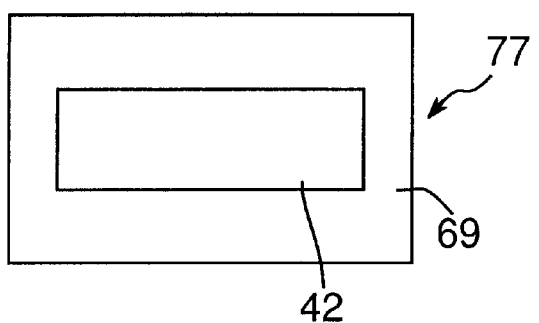
FIG. 20 is a plan view showing the touch panel device according to the above ninth embodiment of FIG. 19.

FIGS. 19 and 20 are a cross-sectional side view and a plan view, respectively, showing a touch panel device according to a ninth embodiment of the present invention. In the ninth embodiment, the lower support body 70 in the eighth embodiment is constituted such that at least the operation area 9 on the lower surface of the touch panel 42 is exposed. That is, the outer package 77 is constituted by a lower support body 71 made of one film adhered on the lower surface of the aforementioned touch panel 42 that exposes at least the operation area 9 on the lower surface of the touch panel 42 and has an area larger than the lower surface thereof; and a sealing material 69 for sealing a recessed portion formed by the side edges of the lower support body 71 and the side end surfaces of the touch panel 42. The sealing material 69 may be provided up to the outside of the operation area on the upper surface side of the touch panel 42 for sealing, but is applied to cover at least the portion in which liquid leakage is most likely to occur in the touch panel 42, that is, not only the side surfaces of the touch panel 42, but the portion where the liquid can be exuded due to a damage to the touch panel 42, that is, the interface between the touch panel 42 and the lower support body 71. As a material of the lower support body 71, the material similar to the material of the aforementioned lower support body 7 can be used. As a material of the sealing material 69, the material similar to the material of the aforementioned sealing material 8 can be used. There is no problem even if the entire lower support body 71 is opaque.

Figure 21:
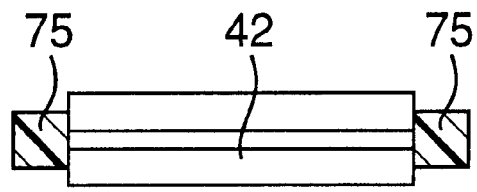
FIG. 21 is a cross-sectional side view showing a touch panel device according to a tenth embodiment of the present invention.
Figure 22:
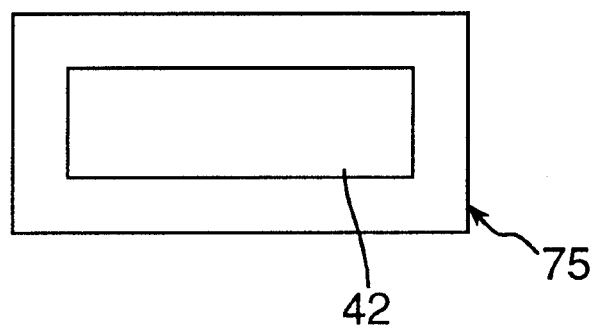
FIG. 22 is a plan view showing the touch panel device according to the above tenth embodiment of FIG. 21.
Figure 23:
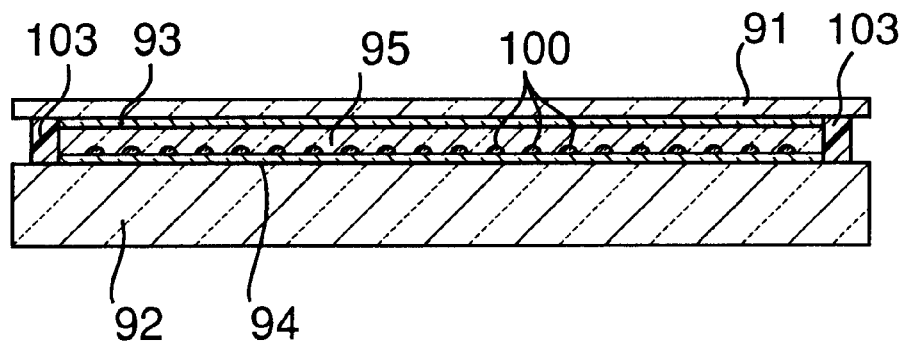
FIG. 23 is a cross-sectional view showing a conventional touch panel which a liquid is filled therein.

FIGS. 21 and 22 are a cross-sectional side view and a plan view, respectively, showing a touch panel device according to a tenth embodiment of the present invention. In the tenth embodiment, the outer package 75 is constituted by a sealing material 75 for further sealing from outside the portion where the upper electrode film 1 and the lower electrode body 2 of the aforementioned touch panel 42 are adhered at their side edges. The sealing material 75 may be provided up to the outside of the respective operation areas 9 on the upper surface side and the lower surface side of the touch panel 42 for sealing, but is applied to cover at least the portion in which liquid leakage is likely to occur in the touch panel 42, that is, the side surfaces of the touch panel 42. As a material of the sealing material 75, the material similar to the material of the aforementioned sealing material 8 can be used.

EXAMPLE

A touch panel was prepared by using a double-face adhesive tape to adhere the peripheries of an upper electrode film having a thickness of 150 μm on the lower side of which an upper transparent electrode made of indium oxide/tin oxide is formed and a lower electrode body made of a glass plate having a thickness of 0.7 mm on the upper side of which a lower transparent electrode made of indium oxide/tin oxide is formed, which are opposed to each other, via spacers (area concentration: 0.01%, height: 3 μm) made of a transparent resin.

A polyester film that has sides, each being 3 mm longer than a side of the upper surface of this touch panel, and has been subjected to a low-reflection treatment by mat coating is adhered on the upper surface of the touch panel and a polycarbonate film having a thickness of 0.3 mm that has sides, each being 3 mm longer than a side of the lower surface of the touch panel, was adhered on the lower surface of the touch panel. Subsequently, a sealing material made of a UV-curable urethane resin is filled into a groove-like portion formed by edges of the polyester film and the polycarbonate film adhered on the upper and lower surfaces, respectively, of the touch panel, that is, the protruded portion from the touch panel and the end surfaces of the touch panel to form an outer package by the polyester film, the polycarbonate film, and the UV-curable urethane adhesive. The space between the upper electrode film and the lower transparent electrode was injected with 2.5 g of silicon oil with a refraction index of 1.4 and a viscosity of 20 cps as a transparent insulating liquid from liquid injecting holes that have been provided in advance on the lower side of the lower electrode body outside the operation area and the polycarbonate film, and then sealed with a sealing material made of a UV-curable urethane resin to obtain a touch panel device.

As a comparative example, a touch panel that is not sealed by a transparent outer package was used. The touch panels of Example. and Comparative Example were maintained under a severe environment with a temperature of 60° C. and a humidity of 90% for 240 hours to compare the occurrence of liquid leakage and the transmittance. As a result, no liquid leakage occurred and the weight did not change before and after the test in the touch panel of Example while liquid leakage occurred at the adhered portion and the weight loss of 0.3 g occurred due to the liquid leakage in the touch panel of Comparative Example. Consequently, the transmittance in Example was 91.0% while the transmittance in Comparative Example lowered to only 90.5% due to the liquid leakage.

Also, as another comparative example, a touch panel that is not sealed by a transparent outer package was used. The glass of the lower electrode body was broken by applying a load of 50 kg under a static pressure on the touch panels of Example and Comparative Example, which were left for 30 minutes, to compare the occurrence of liquid leakage. As a result, no liquid leakage occurred and the weight did not change before and after the test in the touch panel of Example while liquid leakage occurred at the damaged portion and the weight loss of 1.5 g occurred in the touch panel of Comparative Example.

The touch panel device according to the present invention has the constitution and actions described as above and therefore has the following effects.

That is, since a transparent insulating liquid is sealed doubly in the present invention by a constitution in which the touch panel sides are sealed by an outer package which transparently shows or expose at least the operation area of the touch panel, the leakage of the transparent insulating liquid to the outside from the portion where the upper electrode film and the lower electrode body of the touch panel are adhered at their edges can be stopped by the outer package and prevented.

Furthermore, in the present invention, when the constitution is such that the entire touch panel or the most part thereof is enclosed by the aforementioned outer package, liquid leakage can be stopped by the outer package and prevented even in the case where the transparent insulating liquid nearly leaks outside from the portion where the upper electrode film and the lower electrode body of the touch panel are adhered at their edges or a damaged portion of the touch panel.

Therefore, deterioration of prevention of reflection or effects of the improved visibility by a transparent insulating liquid or poor insulation or failures in a circuit board or the like and difficulty in the aftertreatment at the exchange of a damaged touch panel 42, which are caused by the liquid leakage, do not occur.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A touch panel device having an operation area, said touch panel device comprising:
   an upper electrode film having edges, an upper surface and a lower surface;
   a lower electrode body having edges, and upper surface and a lower surface, a periphery of said upper surface of said lower electrode body being adhered to a periphery of said lower surface of said upper electrode film thereby forming space between said upper electrode film and said lower electrode body;
   a transparent insulating liquid sealed in the space between said upper electrode film and said lower electrode body; and
   an outer package continuously covering and sealing said edges of said upper electrode film, said edges of said lower electrode body and a periphery of said lower surface of said lower electrode body, said outer package comprising a material and being disposed so as to transparently show said operation area as viewed from a direction facing said upper electrode film and from a direction facing said lower electrode body.

2. The touch panel device of claim 1, wherein said outer package comprises a bag having a sealed opening, and
   wherein said upper electrode film, said lower electrode body and said transparent insulating liquid are sealed within said bag.

3. The touch panel device of claim 1, wherein said outer package comprises:
   an upper film adhered to said upper surface of said upper electrode film, said upper film having an area that is larger than the total area of said upper surface of said upper electrode film, said upper film comprising a material and being disposed so as to transparently show said operation area from a direction facing said upper electrode film;
   a lower support body adhered to said lower surface of said lower electrode body, said lower support body having an area that is larger than the total area of said lower surface of said lower electrode body, said lower support body comprising a material and being disposed so as to transparently show said operation area from a direction facing said lower electrode body; and
   a sealing material disposed between said upper film and said lower support body so as to seal said edges of said upper electrode film and said edges of said lower electrode body.

4. The touch panel device of claim 3, wherein said sealing material comprises a material that has been subjected to a degassing treatment sufficient to prevent a generation of voids therein.

5. The touch panel device of claim 3, wherein said lower support body is at least 0.025 mm thick.

6. The touch panel device of claim 3, wherein said upper film comprises a film that has been subjected to low-reflection treatment.

7. The touch panel device of claim 3, wherein said lower support body comprises a body that has been subjected to low-reflection treatment.

8. The touch panel device of claim 3, wherein said outer package comprises:
   a rectangular parallelepiped box shaped to cover a periphery of said upper surface of said upper electrode film and to expose said operation area; and
   a sealing material disposed between said periphery of said upper surface of said upper electrode film and said rectangular parallelepiped box.

9. The touch panel device of claim 1, wherein said outer package comprises:
   a rectangular parallelepiped box shaped to cover a periphery of said upper surface of said upper electrode film, to expose said operation area, to cover a periphery of said lower surface of said lower electrode body and to expose an area of the lower electrode body corresponding to said operation area; and a sealing material disposed between said periphery of said upper surface of said upper electrode film and said rectangular parallelepiped box and between said periphery of said lower surface of said lower electrode body and said rectangular parallelepiped box.

10. The touch panel device of claim 1, wherein said outer package comprises:

an upper film adhered to said upper surface of said upper electrode film, said upper film having an area that is larger than the total area of said upper surface of said upper electrode film, said upper film being shaped so as to expose said operation area from a direction facing said upper electrode film;

a lower support body adhered to said lower surface of said lower electrode body, said lower support body having an area that is larger than the total area of said lower surface of said lower electrode body, said lower support body being shaped so as to expose an area of the lower electrode body corresponding to said operation area; and a sealing material disposed between said upper film and said lower support body so as to seal said edges of said upper electrode film and said edges of said lower electrode body.

11. The touch panel device of claim 1, wherein said outer package comprises:

a lower support body adhered to said lower surface of said lower electrode body, said lower support body having an area that is larger than the total area of said lower surface of said lower electrode body such that a portion of said lower support body extends beyond said lower surface of said lower electrode body; and a sealing material disposed on said portion of said lower support body that extends beyond said lower surface of said lower electrode body and on said edges of said lower electrode body.

12. The touch panel device of claim 1, wherein said outer package comprises:

a lower support body adhered to said lower surface of said lower electrode body, said lower support body having an area that is larger than the total area of lower surface of said lower electrode body such that a portion of said lower support body extends beyond said lower surface of said lower electrode body, said lower support body being shaped so as to expose an area of the lower electrode body corresponding to said operation area; and a sealing material disposed on said portion of said lower support that extends beyond said lower surface of said lower electrode body and on said edges of said lower electrode body.

13. The touch panel device of claim 1, further comprising:

spacers disposed on one of said lower surface of said upper electrode film and said upper surface of said lower electrode body, said spacers having an area concentration of at least 0.01% but less than 5%, said spacers having a height of no mare than 15 $\mu$m, wherein said transparent insulating liquid comprises a liquid having a viscosity of no more than 30 cps.

14. The touch panel device of claim 1, wherein said transparent insulating liquid comprises a liquid that has been subjected to a degassing treatment sufficient to prevent a generation of voids therein.

15. The touch panel device of claim 1, further comprising:

spacers disposed on one of said lower surface of said upper electrode film and said upper surface of said lower electrode body, said spacers having an area concentration of at least 0.01% but less than 5%, said spacers having a height of no more than 15 $\mu$m; and a sealing material disposed in and sealing liquid injecting holes that are located in said lower electrode body, wherein the liquid injecting holes are disposed outside of said operation area, wherein said transparent insulating liquid comprises a liquid having a viscosity of no more than 30 cps, wherein said transparent insulating liquid comprises a liquid that has been subjected to a degassing treatment sufficient to prevent a generation of voids therein, and wherein said transparent insulating liquid comprises a liquid having an index of refraction following the relational expression $$\left(\frac{n_A - n_B}{n_A + n_B}\right)^2 < \left(\frac{n_A - 1}{n_A + 1}\right)^2, \text{ and}$$

wherein refractive indices of the said transparent electrode, said transparent insulating liquid, and air are $n_A$, $n_B$ and 1, respectively.

16. The touch panel device of claim 1, wherein at least one of a first transparent electrode surface on said upper electrode film and a second transparent electrode surface on said lower electrode body comprises a surface that has been subjected to a satin finish treatment such that said at least one is capable of scattering light to prevent light interference between said first transparent electrode surface and said second transparent electrode surface.

* * * * *